(12) United States Patent
Stevens (10) Patent No.: US 7,832,361 B2
(45) Date of Patent: Nov. 16, 2010

(54) SYSTEM FOR CLIMBING PETS

(76) Inventor: Tracey Stevens, 4902 Stickley Rd., Rockville, MD (US) 20852

( * ) Notice: Subject to any disclaimer, the term of this patent is extended or adjusted under 35 U.S.C. 154(b) by 259 days.

(21) Appl. No.: 12/060,729

(22) Filed: Apr. 1, 2008

(65) Prior Publication Data
US 2009/0241852 A1 Oct. 1, 2009

(51) Int. Cl.
*A01K 15/02* (2006.01)
*A47F 5/08* (2006.01)
*B65D 19/44* (2006.01)

(52) U.S. Cl. .................. 119/706; 211/87.01; 248/250; 108/55.3

(58) Field of Classification Search .............. 211/87.01, 211/94.01; 119/28.5, 706, 702, 485, 753; 248/220.21, 220.51, 235, 250; 108/55.3
See application file for complete search history.

(56) References Cited
U.S. PATENT DOCUMENTS

| | | | | |
|---|---|---|---|---|
| 5,829,390 A * | 11/1998 | Jonilla et al. | ................ | 119/706 |
| 5,875,735 A * | 3/1999 | Bradley et al. | ............... | 119/706 |
| 6,848,589 B2 * | 2/2005 | Wood | .......................... | 211/189 |
| 2003/0221628 A1 * | 12/2003 | Leon | .......................... | 119/28.5 |
| 2005/0109901 A1 * | 5/2005 | Stitchick et al. | ............. | 248/235 |
| 2009/0050072 A1 * | 2/2009 | Moser et al. | ................ | 119/706 |

* cited by examiner

*Primary Examiner*—Rob Swiatek
*Assistant Examiner*—Kristen C Hayes
(74) *Attorney, Agent, or Firm*—Michael L. Greenberg, Esq.; Greenberg & Lieberman, LLC

(57) ABSTRACT

A system for climbing pets, particularly cats, featuring an expandable rod and an array of wall supports, platforms and accessories. The expandable rod is the only direct connection to a wall while the wall supports are suspended from the expandable rod and the platforms are secured to the wall supports. Accessories such as toys and food/water bowls may be snapped into place on the platform surface via complimentary securing elements. The platforms can be placed at various elevations so that a cat can play, sleep, eat, scratch and avoid other animals in the house in a secure and designated environment.

2 Claims, 6 Drawing Sheets

SYSTEM FOR CLIMBING PETS

FIELD OF THE INVENTION

The present invention relates to an array of wall supports, a main rod, an expandable rod and easily removable platforms that are ultimately secured onto fixed structures such as walls to create a secure environment for climbing pets, particularly cats, along with secured accessories while at the same time allowing the owner to connect platforms into any number of arrangements.

BACKGROUND OF THE PRESENT INVENTION

Indoor cats can get bored easily. This leads to such activities as climbing the drapes and scratching up furniture. In addition, cats have the gumption to get into just about everything regardless of the location. For example, cats tend to perch onto the highest spots possible in a room. This causes problems for owners who do not want their cats to be climbing onto the tops of bookshelves, cabinets and even closets. Because of these issues, owners often turn toward various apparatuses such as padded shelves and steps. However, there remains a need for an apparatus that is adaptable to the point where the owner can easily install platforms onto a designated wall in a changeable fashion that caters to the unique characteristics of the individual cats in the household. In addition, this need also relates to the fact that accessories should be capable of being secured to these platforms. The present invention solves these needs by enabling the user to configure the location of the various platforms while also combining the platform surface with comparable accessories that ultimately are secured to the platform surface.

Multi-pet homes also present unique challenges for owners. Unlike dogs, which tend to be pack animals, cats are inherently loners. Cats can be emotionally and even physically affected when other pets interrupt the cat's toys or food. Moreover, cats prefer places where only they can go. Because of this, there is a need for an environment where cats can escape with their toys and food.

The food issue is especially important in multi-pet homes. Oftentimes, a cat will always have food in its bowl whereas the family dog will be on a feeding schedule. The dog naturally would get into the cat's food under normal circumstances. This creates the need for a cat environment where the cat can eat uninterrupted in a place where the owner can easily fill the bowl but the family dog cannot reach. As mentioned above, the present invention solves this issue as well, while at the same time, maintaining stable and secure accessories such as food/water bowls. This is important because many cats like to swat or otherwise move objects with their paws. The platform surface and comparable accessory qualities prevent this situation from occurring as the accessories of the present invention effectively lock into place at the platform surface.

The market also is full of cat condos, cat shelves and other playground-type devices for cats. However, these types of devices are separate apparatuses that tend to be freestanding. The present invention, by contrast, is an array of expandable rod and wall supports that actually secures onto a designated wall and become part of the home as much as the cats become part of the family. By permitting the owner to easily connect and reconnect various platforms, the present invention satisfies the unique need for adaptability and owner creativity that is lacking in other inventions. This function of the present invention also uniquely permits the owner to quickly and easily change the physical dynamics of the elevated cat environment to create a new dimension to be explored and conquered by the cat.

U.S. Pat. No. 6,196,139 issued to Jensen et al on Mar. 6, 2001, is a wall shelf amusement apparatus for cats that consists of shelves where the cat can jump. Unlike the present invention, the shelves in Jensen must be individually secured to the wall in what amounts to relatively permanent display. In contrast, only the main rod of the present invention must be secured to the wall in this way. Based on this fundamental difference, the platforms of the present invention are merely connected to the wall supports in a manner where the platforms can simply be lifted and removed and replaced onto different locations of the array of wall supports. This function makes the present invention more adaptable to the home environment and the individual habits and likes/dislikes of the cat. In addition, Jensen devotes its shelves to hanging cat toys but does not subscribe to a function of the present invention in that the present invention envisions traditional cat condo devices, cat beds and food bowls to be placed on, or otherwise secured to the platforms for a fully functioning and adaptable cat environment. Jensen also places individual shelves onto the walls, which limits both the creativity and amount of cat toy accessories that can be employed with the overall device. The present invention, however, makes use of the main rod and array of wall supports that serve to not only support multiple platforms, but also doubles as a secure connector for dangling toys or any other cat accessory. In contrast to Jensen, the present invention also encompasses a full range of accessories and objects in the form of toys, feeding bowls, bedding, varied surface textures and other items to engage the pet that would attach to either the platform or the wall supports or the underside of higher configured platforms.

It also should be noted that owners of cats and other climbing animals often provide various apparatus such as padded shelves and perches to facilitate the pets' natural inclinations. Again, these inclinations include exploration and ability to climb to high vantage points for viewing, as well as the need for space specially designated for the pet's enjoyment. These issues also are solved by the present invention as the pet may escape from unwanted attention by other household members, such as dogs, or small children.

U.S. Pat. No. 5,809,933 issued to Conwell, on Sep. 22, 1998, is an animal climbing and perch system. Conwell's perch system is comprised of a series of relatively closely spaced but staggered wall mounted step platforms, which lead to one or more larger perches or platforms, each being mounted or attached directly to the wall. By contrast, the present invention is substantially different as the present invention permits avenues for quicker and easier installation, as well as more versatility, for the user. This is highlighted by the fact that the present invention involves perches or platforms that are attached to a plurality of wall supports hung from an expandable rod. Only the expandable rod need be anchored to the wall. This provides for quicker and easier installation and allows for continuous versatility of arrangement of platforms. Additionally, Conwell does not allow for the necessary accessories in the way of toys, feeding bowls, varied surface textures and other items used to render the platforms enticing and entertaining to pets.

U.S. Pat. No. 5,002,012 issued to Robert Pierrot on Mar. 26, 1991 is an overhead wall mounted cat platform system with multiple access. Pierrot employs an overhead platform that is fastened to the wall and is supported on the upper end of a pole with access to and from via the carpeted climbing pole and also by one or more suspended bridges. The present invention, however, engages in a system of platforms and accessories that are attached to an array of wall supports that hang from a mounted, expandable rod. Only the main rod need be mounted to the wall which permits a quicker and simpler avenue to install the multiple platforms and poles that mount to the wall and/or floor or ceiling, and has the capacity for numerous attachable platforms and accessories, not just fixed suspended bridges that provide climbing and balance challenges, and can be reconfigured numerous times to incite continuous exploration by the pet.

SUMMARY OF THE INVENTION

The present invention employs a main rod, an expansion rod, an array of wall supports and a plurality of movable platforms and attachable accessories to create a structured, creative and adaptable environment for cats or other climbing pets. The present invention consists of a main rod that is affixed to the wall, an array of wall supports that are suspended from the main rod, along with its expansion rod if needed, and independent platforms that are capable of being linked to the wall supports at virtually any point. In addition, attachable accessories such as toys, feeding bowls, and bedding are applied to the platform surfaces. In this manner, the owner can craft a cat environment that is elevated and capable of supporting the weight and jumping force common with cats. A multitude of attractions and stimuli also are engaged.

The platforms themselves use angled insertion elements that securely attach the platforms to the wall supports. The wall supports have numerous insertion points along the width and height of the wall supports, which permit the user to place the platforms evenly at any desired location along the confines of the overall present invention. The result of this connection between the platform and wall supports is an even, stable platform that is capable of holding a requisite amount of weight.

In the preferred embodiment of the present invention, the wall supports are themselves supported by a main rod. The main rod is a rounded element with an angled curve that extends inside from the opening of the main rod. The main rod can be secured to a wall via conventional means such as nails or screws. The wall supports, however, do not need to be directly attached to the wall as a pointed top end of the wall supports are angled to compliment the angled curve of the rod. In this manner, the pointed top end of each wall support—which is angled downward—rests inside the angled curve of the main rod and is capable of hosting a substantial amount of weight. The main rod also may be expanded in an embodiment of the present invention so that additional wall supports can be added to the array.

The present invention also includes accessories. These accessories are such items as toys, bedding and feeding bowls and varied surface textures. The upper surface of the platform is comprised of a connection environment of the LEGO™ type connection. At the same time, the accessories also possess the comparable snapping mechanism of the LEGO™ type connection. This snapping mechanism permits the user to securely place accessories onto the platform. In this manner, the cat will not be able to swat an accessory such as a food/water bowl off of the platform. An additional embodiment of the present invention relates to snapping or otherwise connecting a carpeted-type material to a platform that is conducive to cat scratching. An area between the wall supports and below the rod also can be fitted to simulate a tree or other large scratching area for the cat to enjoy.

BRIEF DESCRIPTION OF THE PREFERRED EMBODIMENT

DETAILED DESCRIPTION OF THE PREFERRED EMBODIMENT

Figure 1:
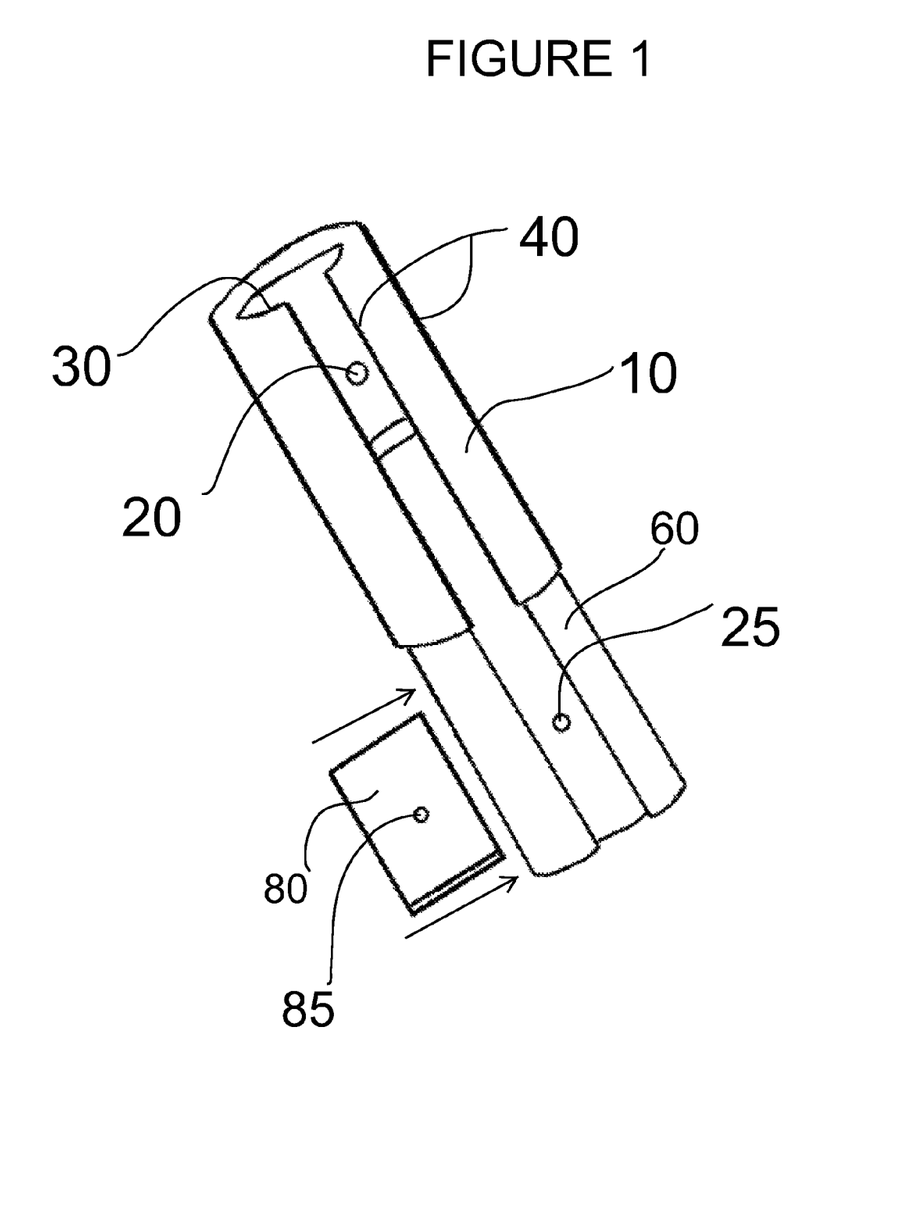
FIG. 1 is a view of the main rod of the present invention.

The present invention is an interchangeable system for climbing pets that enables climbing animals such as cats to play, sleep and eat at a designated and secure location that is both fun and safe. In FIG. 1, we see a view of an embodiment of the main rod (10) of the present invention. The main rod (10) is constructed out of a sturdy material such as metal or hard plastic. The main rod (10) also can be constructed out of a crafted form of wood and is not limited to the more conventional material. The main rod (10) is secured to a fixed structure such as a wall. The main rod (10) is secured to the structure via conventional means at a wall connection point (20) such as bolts, nails or screws. FIG. 1 depicts an embodiment of the present invention where the rod's wall connection point (20) is a screw.

The main rod (10) serves as a secure base for the overall present invention in that the main rod (10) maintains a sturdy and stable element. The main rod (10) is secured to the fixed structure at a heightened elevation. In this manner, the main rod (10) becomes the only aspect of the present invention that needs to be physically and directly connected to the wall or fixed structure.

The width of the main rod (10) is circular in shape with an opening at the point facing away from the fixed structure. In other words, the back portion of the main rod (10) in the preferred embodiment is flat, or flush, against the wall. The circular aspect relates to the main rod's (10) slightly rounded collars that form a semi-circle tunnel when viewed from the end. The main rod (10) opening is defined by the opening slits (40) as seen in FIG. 1. The opening slits (40) are configured to the same size as the pointed top end (100) of the wall support (90) so that it can be placed and ultimately suspended inside the main rod (10). The details relating to the wall support (90) are better demonstrated in FIG. 2 and FIG. 4.

Going back to FIG. 1, we see that the main rod (10) has an angled curve (30), which serves as an angled portion of the main rod (10) to compliment the actual opening slits (40) in ultimately causing the wall supports (90) to be suspended and secured in place. The angled curve (30) compliments the angle and makeup of the pointed top end (100) of the wall support (90). Since the pointed top end (100) angles downward, the pointed top end (100) will be moved between the opening slits (40) and fall into place snuggly along the angled curve (30) of the main rod (10). The angled curve (30) essentially serves as a locking mechanism because the only way to remove the wall support (90) via the pointed top end (100) would be to physically lift the wall support (90) up and then out away from the opening slits (40). Without this action, the wall support (90) via the pointed top end (100) will be secured and balanced within the interior of the main rod (10). However, the weight and balancing effect also serve to prevent a sliding effect. The main rod (10) itself can hold as many wall supports (90) as the length of the main rod (10) permits, coupled with other issues such as wall length.

In FIG. 1, we also see that the main rod (10) is expandable through the use of the expansion rod (60). The expansion rod (60) is fitted tightly inside a portion of the main rod (10). In FIG. 1, we see an embodiment of the present invention where the expansion rod (60) is fitted into the interior of the main rod (10), as it is capable of sliding. The purpose of the expansion rod (60) is to provide the user with the ability to add additional wall supports (90) to the array for an even more encompassing cat environment.

Once the user slides the expansion rod (60) to the desired extension point, the user may secure the expansion rod (60) to the wall via the expansion rod wall connection point (25). The expansion rod wall connection point (25) will typically be of the same conventional connection as the wall connection point (20). In addition, a collar (80) as seen in FIG. 1 will be placed behind the expansion rod (60) once the expansion rod (60) is set at the desired extension length. Whether it is a bolt, screw, nail or some other conventional connection means, the collar hole (85) will be set directly behind the expansion rod wall connection point (25) so that when the expansion rod (60) is secured to the wall, the collar (80) also will be secured. The purpose of the collar (80) is to make the expansion rod (60) flush with the main rod (10). In effect, the collar (80) compensates for the fact that when the expansion rod (60) is extended, the expansion rod (60) will be slightly farther from the wall than the main rod (10) because the expansion rod (60) is initially housed on the interior of the main rod (10). The thickness of the collar (80) is congruent with the thickness of the end of the main rod (10) that is closest to the wall.

Figure 2:
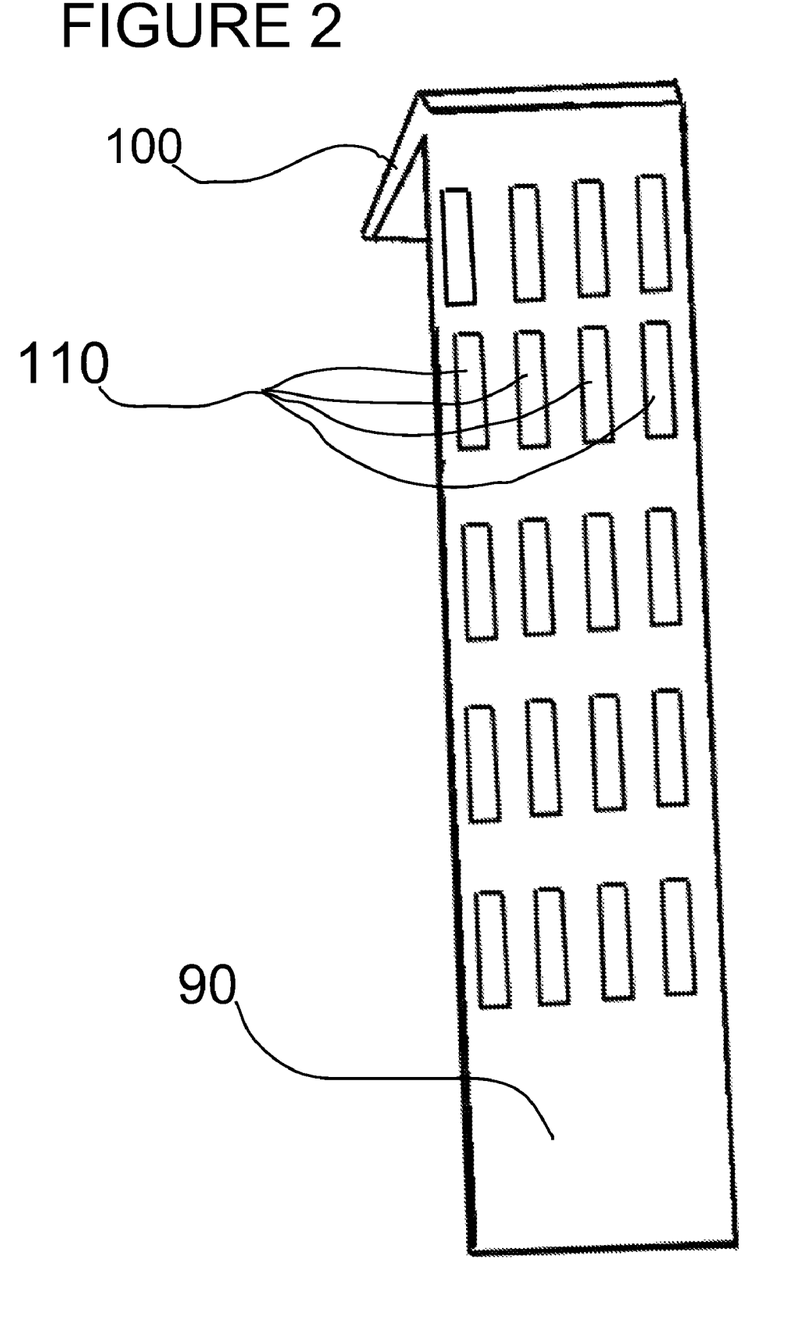
FIG. 2 is a view of a wall support of the present invention.

FIG. 2 offers a view of a wall support (90) of the present invention. The wall support (90) is constructed of a conventional sturdy material such as hard plastic, metal or even crafted wood. As described above, the pointed top end (100) is angled to fit in between the opening slits (40).

Figure 3:
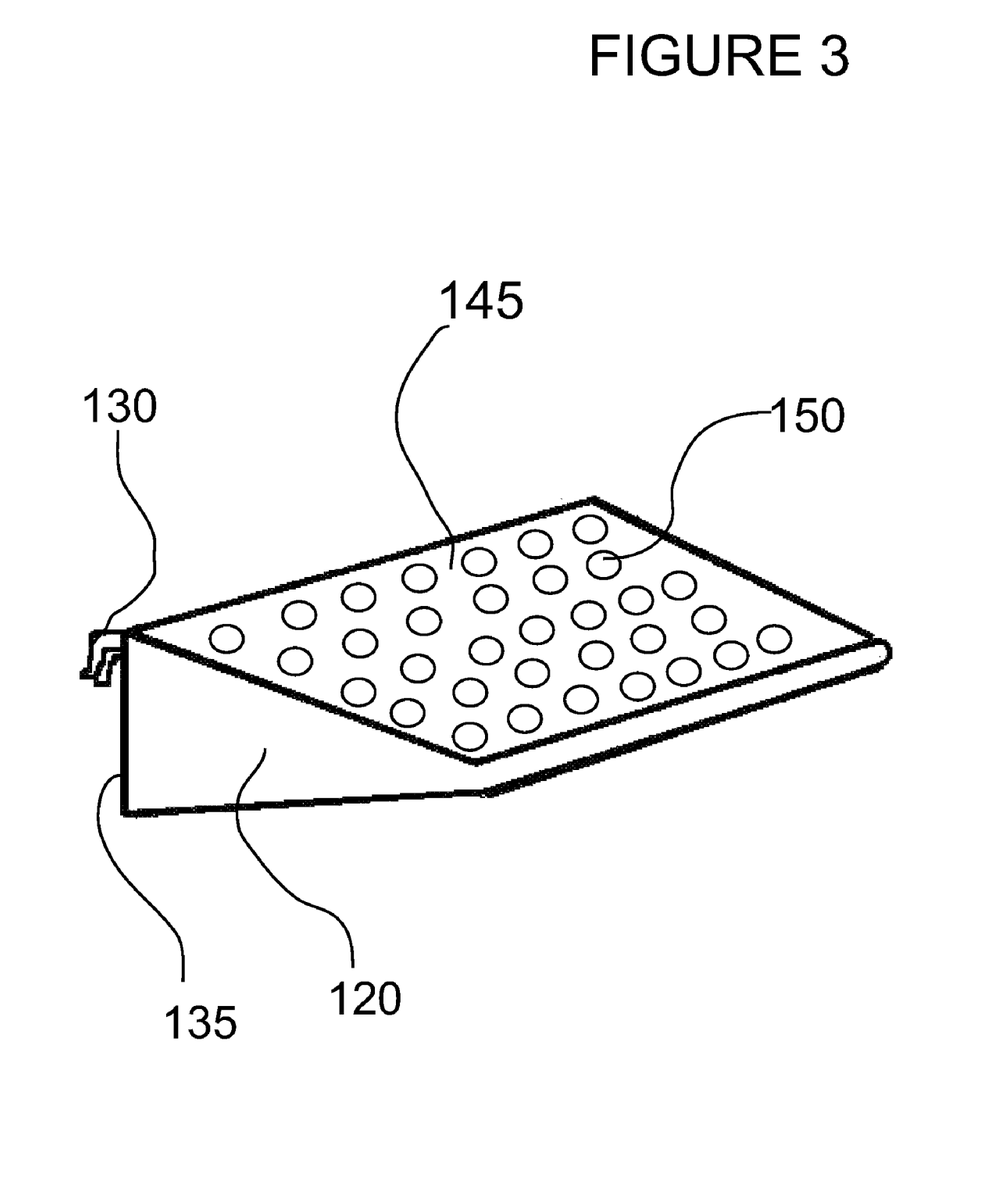
FIG. 3 is a view of a platform of the present invention.

FIG. 2 also shows the insertion points (110) of the wall support (90). All insertion points (110) are identical to each other as they are lined along the wall support (90). In the preferred embodiment, rows of four insertion points (110) will be lined along the wall support (90) as depicted in FIG. 2. At the same time, each individual wall support (90) will be identical to each other in terms of height, width, insertion points (110) and pointed top end (100). This permits uniformity so that the platforms (120) as seen in FIG. 3 will be even. Moreover, the insertion points (110) of FIG. 2 are lined in rows so that the user will have flexibility to place the platforms at virtually any location along the wall. This also permits multiple platforms (120) and other creative placement opportunities. The insertion points (110) are hollowed openings in the wall support (90) to cater to and ultimately withstand the weight and pull of the angled insertion elements (130) of the platform (120) as seen in FIG. 3.

In FIG. 3, we see a view of the platform (120). At the rear end of the platform (120) are at least two angled insertion elements (130). The angled insertion elements (130) are made of a strong and sturdy material such as metal or hard plastic. The height and width of the angled insertion elements (130) are such so that they can fit into the hollowed openings of the insertion points (110) of the wall supports (90). The user may guide the angled insertion elements (130) into the insertion points (110) of at least two separate wall supports (90). The wall supports have equal rows of insertion points (110) so that platforms (120) can be placed onto the wall supports (90) at virtually any location via the use of these insertion points (110) with as many placement options as possible. After guiding the angled insertion elements (130), the user may then slowly let go of the platform (120). The angled insertion elements (130) will fall into place due to the angled aspects and length of their makeup. Once released, the rear end of platform (135) will rest against the wall support (90) as well. These factors will contribute to a sturdy and secure platform (120) that is connected to the wall supports (90).

The platform surface (145) as seen in the preferred embodiment of FIG. 3 is a solid surface with snapping connection circles (150) or blocks (165). The snapping connection circles (150) or blocks (165) are akin to LEGO™ snaps. In essence, the connection circles (150) or blocks (165) are either separate indentations into the platform surface (145) or separate protrusions rising upward from the platform surface (145).

Either way, the connection circles (150) or blocks (165) serve as the counterpart for the opposite and fitting protrusion or indentation that will exist on the bottom surface of an accessory of the present invention. An accessory of the present invention can be anything that might pertain to the health and lifestyle of a cat. Examples include dangle toys, scratching posts, food/water bowls, bedding and shelters. Each of these items would include the corresponding connection circles (150) or blocks (165) to those on the platform surface (145). The accessories will then snap into place at any point on the platform surface (145) that the user decides. By snapping these items into place, the cat will not be able to swat or otherwise move the accessories. This of course prevents messes associated with food/water bowls, etc.

Figure 4:
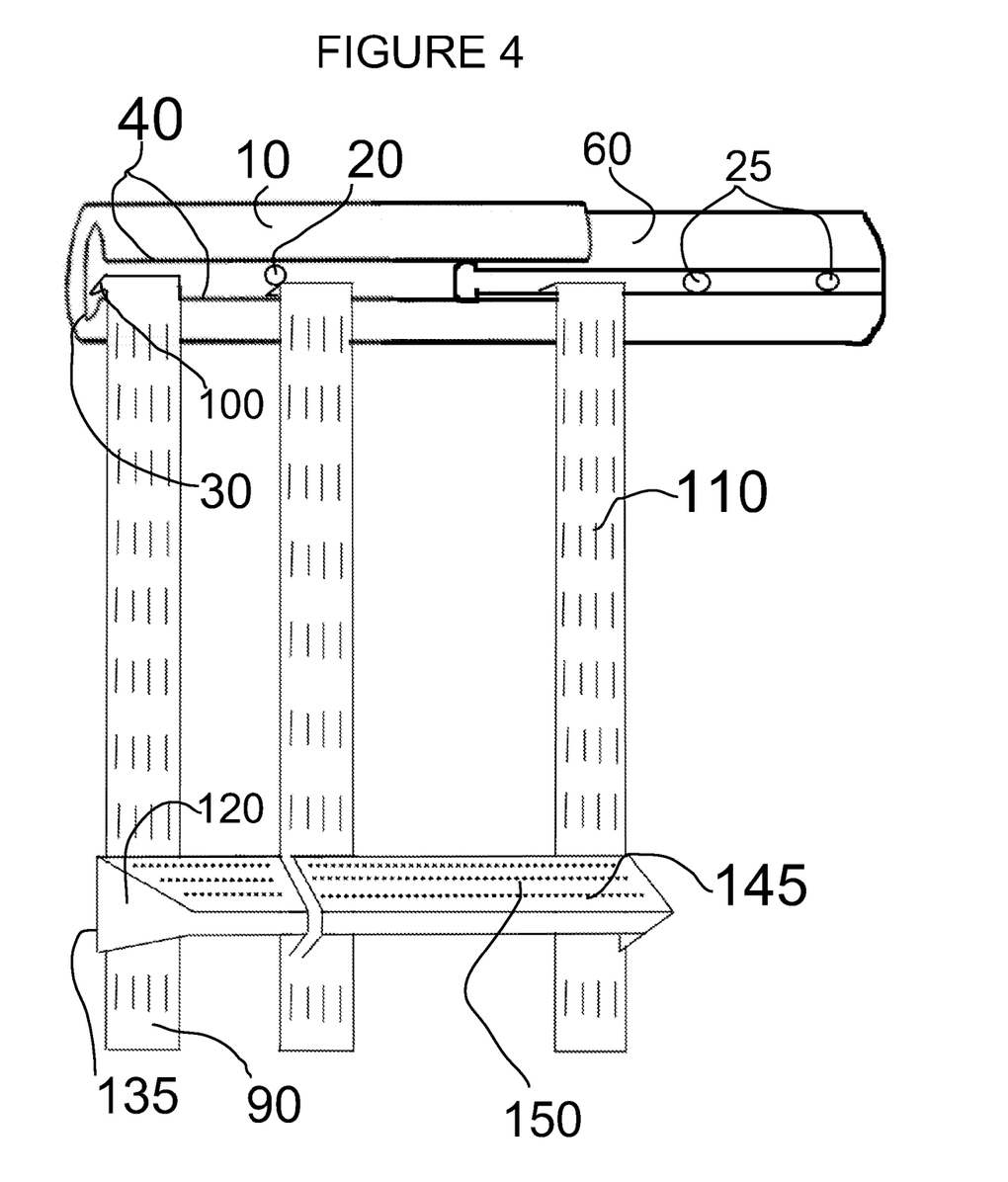
FIG. 4 is an overall view of the present invention without accessories.

FIG. 4 gives us a view of how each of the elements of the present invention fit together in the preferred embodiment. The main rod (10) is attached to a wall. In addition, the extension rod (60) is extended to demonstrate how the expansion potential of the present invention may operate. Meanwhile, we see that three wall supports (90) hang from the main rod (10) through the use of the pointed top end (100), the opening slits (40) and the angled curve (30). Each wall support (90) includes the insertion points (110) that are lined in even rows as seen in FIG. 4. The reason for the even rows of insertion points (110) is obvious through the view of FIG. 4. As we see, the left side of the platform (120) to our left is lined up and inserted into the farthest left insertion point (110). In the example of FIG. 4, we see that the other end of the same platform (120) is inserted into the farthest left insertion point (110) of a second wall support (90). In addition, a second platform (120) also is inserted and ultimately connected to two different wall supports (90) as seen in FIG. 4. In the preferred embodiment of the present invention, the wall supports (90) would be between 45 inches and 55 inches tall, while the main rod (10) would be about 41 inches long. These measurements are based on typical room sizes but the dimensions of the present invention may be constructed to cater specifically for all types of rooms or locations.

With additional rods (10) or through the use of extension rods (60), the user may include as many wall supports (90) as the room allows. The user may then stagger the platforms (120) or otherwise position the platforms (120) in any manner the user wants. The accessories also can be moved around and placed in different locations.

Figure 5:
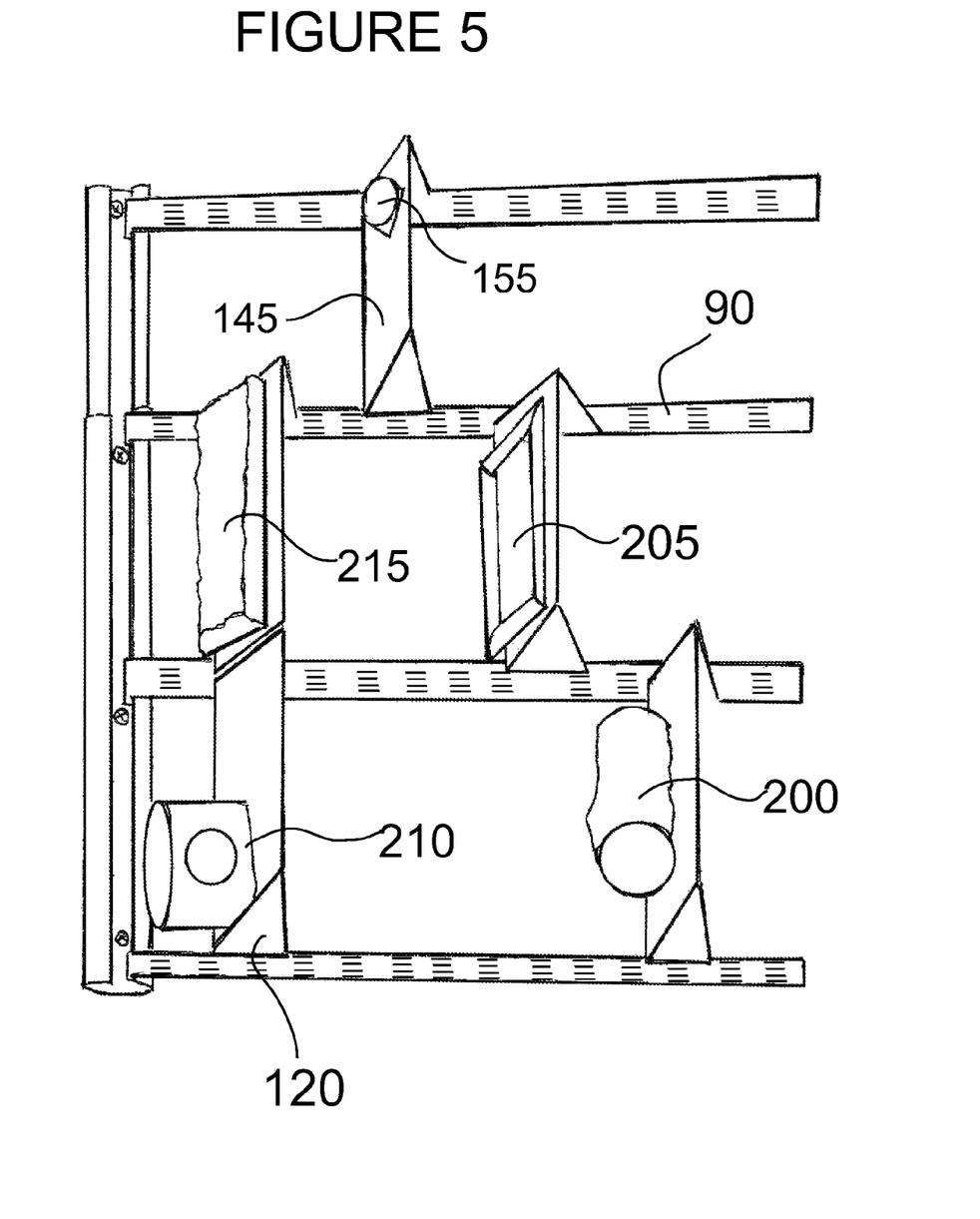
FIG. 5 is an overall view of the present invention including accessories.

FIG. 5 offers an expanded view of the overall present invention in terms of accessories. FIG. 5 depicts an example in the preferred embodiment of potential accessory placement as these accessories are secured to various platform surfaces (145). At the same time, FIG. 5 demonstrates how each platform (120) may be placed at various points of the array of wall supports (90). The system of the present invention permits users to come up with their own placements of both the platforms (120) and accessories. In the example of FIG. 5, we see that a cat may run through a crinkle tunnel (200), use a scratching pad (205), hide in a hide-away (210), rest in a bed (215) or use a food/water bowl (155). These are merely examples of accessories. However, one thing all accessories with the present invention have in common is that the bottom of the accessories will be comprised of corresponding connection circles (150) or blocks (165) that will effectively secure and snap the accessories into place at the platform surface (145) via the connection circles (150) or blocks (165). This function is better viewed in FIG. 6.

Figure 6:
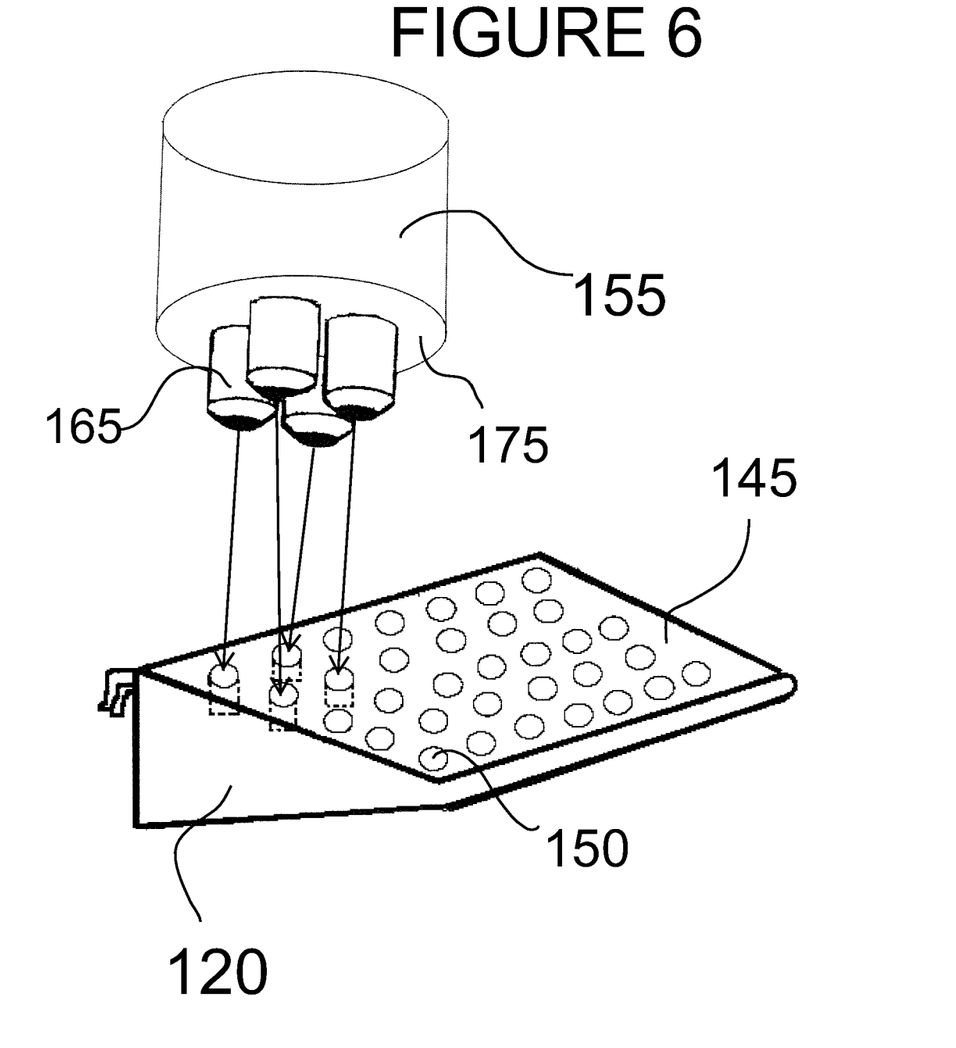
FIG. 6 is a view of an accessory secured to a platform of the present invention.

In FIG. 6, we see an example of an accessory being secured to a platform (120). As we see, the platform surface (145) includes a number of connection circles (150) or blocks (165). The food/water bowl (155) includes corresponding connection circles (150) or blocks (165) on its bottom surface (175). When the connection circles (150) or blocks (165) of the platform surface (145) receive the corresponding connection circle (150) or blocks (165), the food/water bowl (155) or other accessory will snap into place on the platform surface (145). In this way, the accessory will remain stationary and will not be susceptible to being knocked off of the platform surface (145) by the animal. The view in FIG. 6 depicts the corresponding connection circles (150) or blocks (165) as protruding outward while the connection circles (150) or blocks (165) of the platform surface (145) in an inward, receiving position. However, the opposite may also be applied to the present invention.

It is to be understood that the present invention is not limited to the sole embodiment described above, but encompasses any and all embodiments within the scope of the following claims.

I claim:

1. A system for climbing pets, comprising:
a main rod, comprising an angled curve, at least one wall connection point and opening slits;
an expansion rod that is secured to said main rod;
a collar that is secured to said expansion rod;
at least two wall supports disposed from said main rod, said at least two wall supports comprising pointed top ends and rows of insertion points throughout said at least two wall supports;
at least one platform, comprising at least two angled insertion elements and a platform surface, wherein said platform surface is comprised of connection circles; and
at least one accessory, comprising a bottom with corresponding connection circles configured to secure to said connection circles of said platform surface.

2. A system for climbing pets, comprising:
a main rod, comprising an angled curve, at least one wall connection point and opening slits;
an expansion rod that is secured to said main rod;
a collar that is secured to said expansion rod;
at least two wall supports disposed from said main rod, said at least two wall supports comprising pointed top ends and rows of insertion points throughout said at least two wall supports;
at least one platform, comprising at least two angled insertion elements and a platform surface, wherein said platform surface is comprised of connection blocks; and
at least one accessory, comprising a bottom with corresponding connection blocks configured to secure to said connection blocks of said platform surface.

* * * * *